United States Patent [19]

Ley et al.

[11] Patent Number: 4,767,457

[45] Date of Patent: Aug. 30, 1988

[54] PLASTER, RENDERS, MASONRY PAINTS, INTERIOR PAINTS AND GLAZES CONTAINING AN AQUEOUS DISTEARYLDIKETENE EMULSION AS A WATER REPELLENT

[75] Inventors: Gregor Ley, Wattenheim; Michael Melan, Wachenheim; Eckehardt Wistuba, Bad Durkheim, all of Fed. Rep. of Germany

[73] Assignee: BASF Aktiengesellschaft, Rheinland-Pflaz, Fed. Rep. of Germany

[21] Appl. No.: 924,766

[22] Filed: Oct. 30, 1986

[30] Foreign Application Priority Data

Nov. 12, 1985 [DE] Fed. Rep. of Germany ....... 3540042

[51] Int. Cl.$^4$ .............................................. C09K 3/18
[52] U.S. Cl. .......................................... 106/2; 106/90; 106/314; 106/504
[58] Field of Search ...................... 106/2, 308, 85, 90, 106/93, 97, 104, 107, 108, 191, 208 N; 252/351

[56] References Cited

U.S. PATENT DOCUMENTS

| | | | |
|---|---|---|---|
| 3,366,502 | 1/1968 | Lombardo | 106/314 |
| 4,360,385 | 11/1982 | Grunewalder | 106/2 |
| 4,404,239 | 9/1983 | Grunewalder | 106/2 |
| 4,529,649 | 7/1985 | Tikeuchi et al. | 428/328 |
| 4,617,057 | 10/1986 | Plueddemann | 106/2 |

*Primary Examiner*—Josephine Barr
*Attorney, Agent, or Firm*—Oblon, Fisher, Spivak, McClelland & Maier

[57] ABSTRACT

Plasters, renders, masonry paints, interior paints and glazes which contain from 0.5 to 10% by weight of a distearyldiketene emulsion consisting of
(a) from 3 to 40 parts by weight of distearyldiketene,
(b) from 10 to 70 parts by weight of a solvent,
(c) from 5 to 50 parts by weight of water and
(d) from 0.5 to 5 parts by weight of emulsifier have particularly advantageous properties.

2 Claims, No Drawings

PLASTER, RENDERS, MASONRY PAINTS, INTERIOR PAINTS AND GLAZES CONTAINING AN AQUEOUS DISTEARYLDIKETENE EMULSION AS A WATER REPELLENT

The present invention relates to a method for rendering dispersion-based coating materials, synthetic resin-bonded renders and cement-containing and cement-free plasters water repellent by means of aqueous distearyldiketene emulsions.

In the preparation of coating materials, synthetic resin-bonded renders and cement-containing and cement-free plasters, water repellents are frequently added. Silicones, ethylene wax dispersions and metal soaps, eg. zinc stearate, are used for this purpose. However, because of incompatibility, the use of silicones frequently leads to surface defects, such as fisheyes. Moreover, overcoating may not be possible since the silicones migrate to the surface and thus reduce adhesion. Ethylene wax dispersions do not in general produce any flow defects in the film but reduce the gloss of paints having a low pigment content and thus frequently act as flatting agents. Furthermore, their water repellent effect is unsatisfactory since they contain large amounts of emulsifiers, frequently from 4 to 15% by weight, based on the amount of wax.

Metal soaps, eg. zinc stearate, are difficult to disperse homogeneously in aqueous coating materials. Moreover, they too have a flatting effect. Ion-sensitive dispersions may furthermore be coagulated by metal soaps.

Because of its consistency, distearyldiketene too is difficult to incorporate into aqueous coating materials and renders.

We have found that plasters, renders, masonry paints, interior paints and glazes which contain, as a water repellent, from 0.5 to 10% by weight of a distearyldiketene emulsion which consists of from 3 to 40 parts by weight of distearyldiketene, from 10 to 70 parts by weight of a solvent, from 5 to 50 parts by weight of water and from 0.5 to 5 parts by weight of emulsifier have particularly advantageous properties.

The distearyldiketene emulsions have a shelf life of more than 6 months, can be very readily incorporated into aqueous coating materials, renders, plasters and glazes containing polymer dispersions, possess good compatibility, do not have a flatting effect and impart good water repellency to these systems. Furthermore, the overcoating properties are not adversely effected, ie. there are no adhesion problems. The novel distearyldiketene emulsions can be particularly effectively used in synthetic resin-bonded renders; such renders become substantially less soiled and, for example, are not attacked by algi, fungi and moss within a period of 2 years.

Wood glazes based on polymer dispersions can also be rendered water repellent by means of the novel distearyldiketene emulsions. The water repellent glazes have an advantageous effect on the moisture balance of the wood coated with such a glaze, so that the wood is attacked only slightly, if at all, by wood-destroying fungi.

Interior paints to which distearyldiketene emulsions have been added according to the invention possess greater water resistance and therefore improved wet abrasion properties.

In cement-containing and cement-free plasters, the water repellent action of the distearyldiketene emulsions has an advantageous effect on the glass cloth (reinforcing fabric) used in heat insulation systems, since this fabric is hydrolyzed to a lesser extent and its tensile strength is therefore not reduced. Furthermore, the distearyldiketene emulsions prevent moisture from penetrating the plasters and renders during prolonged periods of rain.

The distearyldiketene emulsions which are known per se and are disclosed in, for example, DE-A-25 14 128, can advantageously be prepared in forced-circulation mixers, eg. Ultra-Turrax mixers, in which the water and the emulsifier are initially taken. From 1 to 5% of the solvent can then be introduced, while stirring vigorously. The distearyldiketene, dissolved in the solvent to give a solution which generally contains from 5 to 40% by weight of distearyldiketene, can be introduced into this preliminary emulsion, while stirring.

Suitable solvents are esters, for example mixtures of di-n-butyl esters of adipic, glutaric and succinic acid, 2,2,4-trimethylpentane-1,3-diol 1-isobutyrate, and esters of $C_2$–$C_8$-carboxylic acids with $C_4$–$C_{25}$-alkanols, hydrocarbons, eg. xylene, toluene, gasolines whose boiling points are from 90° to 260° C., and terpenes, and natural oils, such as pine oil, tall oil and linseed oil. Other suitable solvents are oligomeric polymers, eg. oligostyrene or oligoisobutylene and condensates, ie. esters of diols and dicarboxylic acids.

Examples of suitable emulsifiers are alkylsulfates, alkylsulfonates and alkylethersulfates, whose alkyl groups are generally of 8 to 25 carbon atoms. Oxyethylation products of $C_8$–$C_{12}$-alkylphenols, fatty alcohols, fatty acids and fatty amides having a degree of oxyethylation of in general from 5 to 50, preferably from 10 to 30, are also useful. The sulfated products of the above compounds can also be used.

The distearyldiketene emulsion is added to, or incorporated into, the coating systems to be rendered water repellent, eg. renders, emulsion paints, glazes and plasters, in amounts of from 0.5 to 10, preferably from 0.75 to 4, % by weight, based on the coating systems, the said emulsion generally being stirred in.

In the Examples which follow, parts and percentages are by weight.

EXAMPLE 1

Preparation of the distearyldiketene emulsion 1 part of sulfated, oxyethylated p-n-nonylphenol having a degree of oxyethylation of 25 is introduced into 25 parts of water. 3 parts of mineral spirit having a boiling range of from 180° to 210° C. are stirred vigorously into the emulsifier solution, after which 71 parts of a 20% strength solution of distearyldiketene in mineral spirit are added in the course of 15 minutes, while stirring vigorously.

The viscosity of the resulting emulsion is 2000 mPa.s.

Synthetic resin-bonded render according to the invention, containing distearyldiketene emulsion.

17.9 parts of distearyldiketene emulsion are incorporated into the render of comparative example a.

The results are shown in Table 1.

COMPARATIVE EXAMPLE a (Synthetic resin-bonded render without water repellent)

| | |
|---|---|
| 50% aqueous dispersion of a copolymer of equal amounts of n-butyl acrylate | 128.0 parts |

-continued

| | |
|---|---|
| and styrene | |
| Tetrapotassium pyrophosphate (50% strength aqueous solution) | 4.6 parts |
| Mineral spirit (boiling range 180–210° C.) | 60.0 parts |
| Hydroxyethylcellulose (3% strength aqueous solution) | 21.0 parts |
| Titanium white | 32.0 parts |
| Calcium carbonate (mean particle diameter 10–200 μm) | 419.0 parts |
| Aluminum silicate | 89.5 parts |
| Calcium carbonate (mean particle diameter 1.2–1.8 mm) | 230.0 parts |
| Silicone-based commercial antifoam | 3.8 parts |
| Water | 6.9 parts |

The results are shown in Table 1.

COMPARATIVE EXAMPLE b (Synthetic resin-bonded renders containing ethylene wax dispersion)

5 parts of a 60% strength aqueous ethylene wax dispersion are incorporated into the render of Comparative Example a.

The results are shown in Table 1.

TABLE 1

Test results for the renders which have been rendered water repellent and those which have not.

| | Comparative a | Examples b | Example 1 |
|---|---|---|---|
| (a) Water absorption after 24 hours The renders dried at room temperature for 1 week are stored in water | 12% | 9.5% | 5.5% |
| (b) Soiling after exposure to outdoor weathering for 2 years | heavily soiled | heavily soiled | very slightly soiled |
| (c) Water repellent action after exposure to outdoor weathering for 2 years Time taken for absorption of 1 ml of water | immediately | after 10 minutes | after 30 minutes |

COMPARATIVE EXAMPLE c (Cement-containing plaster without water repellent)
Hydroxyethylcellulose (Tylose MHB 30,000)

| | |
|---|---|
| (2% strength aqueous solution) | 125 parts |
| 20% strength aqueous sodium hydroxide solution | 1 part |
| Commercial preservative | 3 parts |
| Mineral oil-based commercial antifoam | 1 part |
| Polyacrylonitrile fibers (length 2–4 mm) | 5 parts |
| Water | 35 parts |
| Calcium carbonate (diameter 10–43 μm) | 50 parts |
| Calcium carbonate (diameter 40–200 μm) | 230 parts |
| 50% strength aqueous dispersion of a 1:1 copolymer of styrene and butyl acrylate | 150 parts |
| Quartz sand (diameter about 0.3 mm) | 400 parts |
| | 1000 parts |

300 parts of PZ 35 F cement are incorporated into the plaster.

The results are shown in Table 2.

EXAMPLE 2

Cement-containing plaster with distearyldiketene emulsion

2% (solids/solids, based on the plaster) of distearyldiketene emulsion from Example 1 are incorporated into the cement-containing plaster from Comparative Example c.

The results are shown in Table 2.

TABLE 2

Test results for the cement-containing plasters

| | Comparative Example c | Example 2 |
|---|---|---|
| (a) Water repellent action measured in minutes and corresponding to the time taken for 1 ml of water to be absorbed after the plaster has been dried for 24 hours at room temperature | 4 min | 45 min |
| (b) Setting capacity | good | good |

COMPARATIVE EXAMPLE d

| (Interior paint without water repellent) | |
|---|---|
| Water | 68 parts |
| Ammonium polyacrylate (25% strength aqueous solution) | 3 parts |
| Sodium phosphate (25% strength aqueous solution) | 3 parts |
| Ammonia (concentrated aqueous solution) | 1 part |
| Silicone-based commercial antifoam | 2 parts |
| Mineral spirit (boiling range 180–210° C.) | 20 parts |
| Propylene glycol | 10 parts |
| Hydroxyethylcellulose (2% strength aqueous solution) | 250 parts |
| Titanium white | 60 parts |
| Aluminum silicate | 10 parts |
| Calcium carbonate (diameter 10–80 μm) | 480 parts |
| Silicone-based commercial antifoam | 2 parts |
| 55% strength aqueous dispersion of a copolymer of 60 parts of vinyl propionate and 40 parts of tert-butyl acrylate | 88 parts |

The results are shown in Table 3.

EXAMPLE 3

(Interior paint containing distearyldiketene emulsion)

18 parts of distearyldiketene emulsion from Example 1 are incorporated into the interior paint from Comparative Example d.

The results are shown in Table 3.

TABLE 3

Test results for the interior paints

| | Comparative Example d | Example 3 |
|---|---|---|
| Wet abrasion resistance according to DIN 53,778 | 640 abrasion cycles | 950 abrasion cycles |

We claim:
1. A dispersion-based coating material, synthetic resin-bonded render, cement-containing plaster or cement-free plaster, containing from 0.5 to 10% by weight of a distearyldiketene emulsion consisting of
   (a) from 3 to 40 parts by weight of distearyldiketene,
   (b) from 10 to 70 parts by weight of a solvent,

(c) from 5 to 50 parts by weight of water and
(d) from 0.5 to 5 parts by weight emulsifier, as a water repellent.

2. A process for rendering a dispersion-based coating material, synthetic resin-bonded render, cement-containing plaster or cement-free plaster water repellent, wherein from 0.5 to 10% by weight of a distearyldiketene emulsion consisting of
(a) from 3 to 40 parts by weight of distearyldiketene,
(b) from 10 to 70 parts by weight of a solvent,
(c) from 5 to 50 parts by weight of water and
(d) from 0.5 to 5 parts by weight emulsifier, are added thereto.

* * * * *